Nov. 11, 1930.  J. SCHNEEMANN  1,781,528
TABLE CONTACT
Filed March 21, 1929
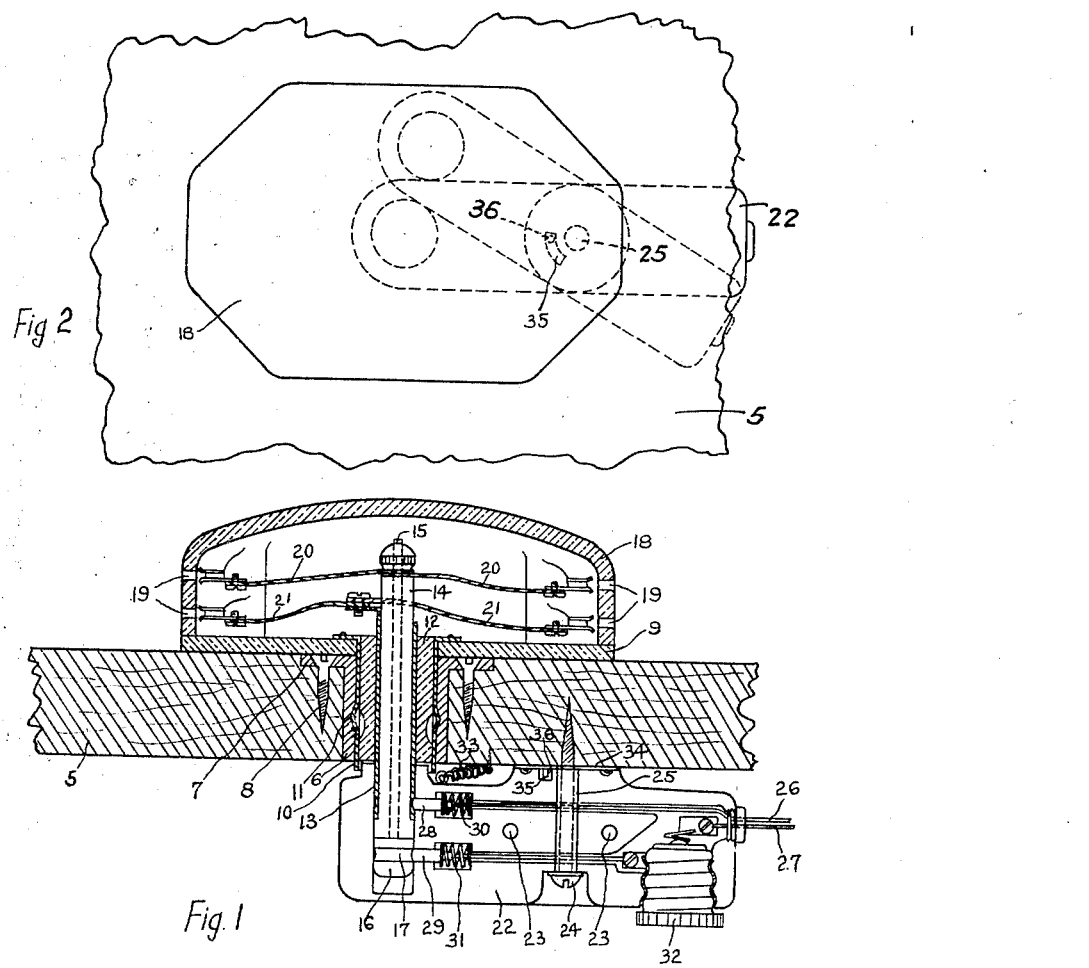
INVENTOR.
JUSTIN SCHNEEMANN
BY Erich J. Michaelis
ATTORNEY.

Patented Nov. 11, 1930

1,781,528

UNITED STATES PATENT OFFICE

JUSTIN SCHNEEMANN, OF CHICAGO, ILLINOIS

TABLE CONTACT

Application filed March 21, 1929. Serial No. 348,748.

The invention relates to electric connections, and the object of the invention is to provide an electric contact adapted to be attached to a table, sideboard, a shelf, or the like, so that electric utensils, such as percolators, toaster and so forth may be easily connected with a source of electricity, while they are being used and located on a dining table or the like.

A further object of the invention is to provide an electric contact adapted to be fastened securely but removably to a table or the like.

Other objects of the invention not specifically mentioned may be easily ascertained and understood from the following description in connection with the drawings forming a part thereof. It is however, to be noted, that said invention is not to be limited or restricted to the exact construction or formation shown in the drawings and described in the specification, but that said invention only to be limited by the scope of the claims appended hereto. In the drawings illustrating a prefered embodiment of the invention.

Fig. 1 is a vertical section of a contact according to the present invention fastened to a table or the like.

Fig. 2 is a top view of Fig. 1.

In a table 5 a square hole is provided and a sleeve 6 having a flange 7 is inserted in said hole and is held in position by means of screws 8 extending through holes provided for this purpose in the flange 7.

A plate 9 of insulation material is provided with a central hole. A pair of flat springs 10 may be fastened to the upper surface of said plate and extend downwardly through the hole therein. Said springs are each provided with a lug 11 or the like which is adapted to engage a notch provided in the sleeve 6, so that the plate 9 and anything that may be attached hereto, can be securely but removably fastened to the table by simply inserting the springs into the sleeve 6 and forcing them down until the lugs 11 will engage the grooves or notches in the sleeve 6. Inside or between said springs a sleeve 12 of insulation material is arranged which in turn surrounds a metal sleeve 13. A cylindrical block 14 of insulation material is located inside of the metal sleeve and contains a metal rod 15 having at its lower end a knob or head 16 provided with a circular groove 17.

On top of the insulation plate 9 a box like structure 18 is arranged made from insulation material, and in the side walls of said box a plurality of push contacts are arranged as indicated at 19 in Fig. 1. Each push contact is connected by means of a conductor 20 with the metal rod 15 and by means of a second conductor 21 with the metal sleeve 13.

From the above description and the drawings it is easy to see how the structure described so far can be removably attached to a table or the like. It is to be noted that the metal sleeve 13 and insulation block 14 extend below the table plate 5, and that the knob 16 of the metal rod 15 extends below the insulations block 14.

A housing 22 is located underneath the table plate and is made of insulation material. Preferably this housing is constructed in two equal parts of which only one is shown. Each of said parts is provided with a pair of holes 23 adapted to receive bolts or the like for clamping the two housing parts together. The housing is fastened to the underside of the table by means of a screw 24 which extends through a sleeve 25 inserted in the housing, so that it is possible to pivot the housing about its fastening means, if so desired. Electric leads 26 and 27 extend from a source of electricity into the housing and are connected each with a plunger 28 and 29 respectively, which are slidably arranged in said housing. Springs 30 and 31 respectively are arranged so that they will engage said plungers and urge the same to extend into a bore provided in the insulation housing and adapted to receive the lower ends of the metal sleeve 13 of the insulation block 14 and head 16 extending below the table plate. In this manner the plunger 28 will be forced into contact with the metal sleeve 13, while the plunger 29 will engage the groove 17 of the head 16.

In order to protect the apparatus connected with the above described contact a fuse 32 may be provided in the housing and may be inserted in the electric circuit.

A spring 33 may be fastened to the lower surface of the table board and may extend towards the inner end of the housing and engage the same. This spring is to be arranged so that it will pivot the housing about the pivot screw 24, when the upper structure is removed from the sleeve 6. This is desirable in order to remove the housing from underneath the hole in the table and thereby prevent dirt and the like from falling and collecting in said housing.

In order to facilitate the pivotal movement of the housing a metal plate 34 may be fastened on the underside of the table and the pivot screw 24 may extend through said plate so that the plate forms the base, on which the housing will pivot. In order to limit the pivotal movement in either direction, the housing may be provided with an arcuate groove 35 of a certain length, and a pin 36 may be arranged on the base plate 34 and may extend downwardly therefrom into the arcuate groove forming an end stop for the pivotal movement of the housing.

Having described my invention and how the same is to be performed I claim as new and desire to secure by Letters Patent:

1. In a device of the class described in combination with a table board having a hole therein, a sleeve fastened to said board and extending into said hole and having a depression in its bore, a top housing, electric contacts in said housing, means on said housing adapted to extend into said sleeve and removably engaging said depression, electric conductors connected to said contacts and extending downwardly from said top housing through and beyond said hole, a lower housing and electric conductors in said lower housing to contact with said first mentioned conductors.

2. In a device of the class described in combination with a table board having a hole therein, a top housing, electric contacts in said housing, means for removably fastening said housing to said board, extending downwardly from said housing and adapted to engage the walls of said hole, electric conductors extending from said housing through and beyond said hole, said conductors being insulated from each other and connected with said contacts, a lower housing fastened to the lower surface of said board, electric conductors in said lower housing, sliding contacts in said lower housing, connected to the second conductors and means for engaging said sliding contacts and urging the same into contact with the first mentioned electric conductors.

3. In a device of the class described in combination with a table board having a hole therein an upper housing, contacts in said housing, means for removably attaching said housing to the upper surface of said board, electric conductors insulated from each other and extending from the upper housing through said hole, said conductors being electrically connected with said contacts, a lower housing, means for pivotally fastening said lower housing to the under surface of said board, the electric conductors extending into said lower housing, a second pair of electric conductors in said lower housing, sliding contacts arranged in said lower housing and electrically connected with the second pair of electric conductors, means arranged in said lower housing for engaging said sliding contacts and urging them into contact with the first mentioned conductors.

4. In a device of the class described in combination with a board having a hole therein, an upper housing, contacts therein, means for removably attaching said housing to said board, a pair of conductors electrically connected to said contacts and extending through said hole, a lower housing, means for pivotally fastening said lower housing underneath said board, said lower housing being adapted to receive the lower end of the above mentioned conductors, a second pair of conductors arranged in the lower housing, sliding contacts connected with said second pair of conductors, means for engaging said sliding contacts and urging them into contact with the first mentioned conductors, and means on the lower face of the board for engaging the lower housing and imparting a pivotal movement to said lower housing after the upper housing has been removed from said board.

5. In a device of the class described, in combination with a table having a hole therein, an upper housing, electric contacts therein, means for removably fastening said upper housing to said board, a pair of electric conductors connected to said contacts and extending through said hole, a lower housing pivotally fastened underneath said board and adapted to receive the lower ends of the electric conductors, a second pair of electric conductors arranged in said lower housing, a pair of sliding contacts in said lower housing and connected with the second pair of conductors, means for engaging said sliding contacts and urging them into contact with the first mentioned conductors, means on said board for engaging the lower housing and urging them into pivotal movement, and means for limiting said movement.

In witness whereof I affix my signature.

JUSTIN SCHNEEMANN.